March 18, 1958
R. C. PRATT
2,826,784
PLASTIC PIPE MOLDING APPARATUS
Filed June 13, 1956
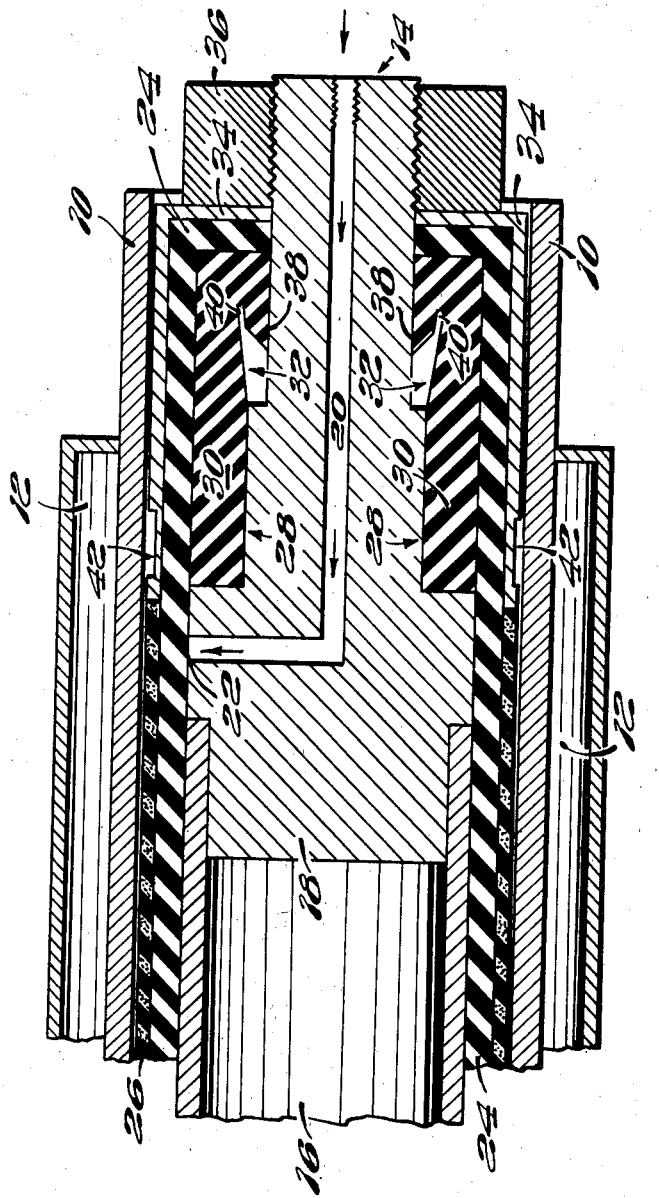
INVENTOR.
ROBERT C. PRATT
BY PORTER, CHITTICK & RUSSELL
ATTORNEYS

United States Patent Office 2,826,784
Patented Mar. 18, 1958

2,826,784

PLASTIC PIPE MOLDING APPARATUS

Robert C. Pratt, Hanover, Mass.

Application June 13, 1956, Serial No. 591,125

1 Claim. (Cl. 18—19)

This invention relates to plastic pipe molding apparatus, and more particularly to means for sealing the same for molding under high pressure.

A principal object of my invention is to provide a seal for a resilient diaphragm within plastic pipe molding apparatus capable of withstanding pressures up to 3,000 pounds per square inch.

Further objects and features of my invention will best be understood and appreciated from a detailed description of a preferred embodiment thereof, selected for purposes of illustration and shown in the accompanying drawing in which:

The single figure is a view in cross section of one end of the pipe molding apparatus of my invention showing particularly the sealing mechanism therein.

The preferred embodiment of my invention herein shown comprises a hollow cylindrical steel pipe or shell 10 surrounded by a jacket 12 employed for the dual purpose of heating and cooling the shell 10. A mandrel indicated at 14 is placed in the shell 10 and comprises a cylindrical tube 16 with end plugs 18 welded thereto. It will be understood, of course, that a plug 18 is located at each end of the mandrel 14, but that only one such plug 18 need be shown herein for the purposes of describing and illustrating this invention. The plug 18 is provided with a conduit 20 which passes from the outer end of the plug 18 through the core thereof and eventually to the side as indicated at 22. The mandrel 14 is surrounded by a resilient diaphragm 24 which may be made of rubber or various well-known substitutes for rubber. When the mandrel 14 and diaphragm 24 are placed within the shell 10, they are spaced therefrom by a narrow clearance of sufficient width to permit elements of plastic pipe 26 to be wrapped around the outer surface of the diaphragm 24 and still fit within the shell 10. In this way fluid pressure may be applied to the inside of the diaphragm 24 through the conduit 20 for the purpose of exerting a molding pressure against the plastic pipe 26 from the inside outward against the shell 10.

During the molding stage, it will be understood that tremendous pressure is applied to the diaphragm 24, and that rubber-like substances become practically fluid or plastic under such conditions. Therefore, the end of the shell 10 adjacent to the mandrel 14 must be provided with a seal which, at one and the same time, protects the diaphragm 24 and insures adequate application of pressure to the plastic pipe elements 26. In the preferred embodiment of my invention herein described, this is accomplished by recessing the mandrel 14 as indicated at 28, and by vulcanizing a rubber collar 30 to the inner surface of the diaphragm 24 in the area of the recess 28. The collar 30 is constructed and dimensioned to fit the recess 28 except in the area indicated at 32 where the collar 30 is indented to provide a pressure-equalizing void. Further to complete the seal, I place a heavy steel cup 34 over the end of the diaphragm 24 adjacent to the end opening of the shell 10. The cup 34 fits into the shell 10 with a small clearance. A nut 36 is threaded to the terminal end of the mandrel 14 and is taken up against the cup 34 to secure it in place and prevent any backward slippage thereof which might otherwise be caused by pressure within the diaphragm 24.

The operation of my device will now be apparent from the foregoing description, from which it will be seen that fluid pressure entering the diaphragm 24 through the conduit 20 urges diaphragm 24 and in turn the plastic pipe elements 26 outwardly against the shell 10. At the same time, the fluid pressure is exerted longitudinally of the mandrel and against the collar 30 where it eventually penetrates into the pressure-equalizing void 32. When this occurs the tendency of the rubber diaphragm 24 and collar 30 to expand longitudinally of the mandrel is more or less offset by the fluid pressure within the void 32.

It should also be pointed out that the contour of the void 32 is of importance in that it provides for a sealing portion of the collar 30 designated by the numeral 38 which extends inwardly of an innermost extension 40 of the void 32. In this way the tendency of the fluid pressure to creep outwardly along the surface of the mandrel is minimized. It is believed that the portion 38, being relatively free both of longitudinal and radial movement, under these conditions of changing pressure is more capable of creating an effective fluid seal at the end of the mandrel than the inner portions of the collar 30 which are constantly being moved relative to the mandrel by the changes in pressure.

It should also be noted that the cup 34 in the preferred embodiment herein described is provided with a shallow recess 42 on its outer surface near its margin which abutts the plastic pipe 26. This recess 42 serves to collect any excess resin which may be extruded from the plastic pipe 26 during the molding operation, and by localizing the collection of this resin, it minimizes the tendency for the cup 34 to stick to the inside of the shell 10 either during or after the molding operation.

Since various minor modifications and changes to this preferred embodiment of my invention will now be apparent to those skilled in the art, it is not my intention to confine the invention to the precise form herein shown, but rather to limit it in terms of the appended claims.

Having thus described and disclosed a preferred embodiment of my invention, what I claim as new and desire to secure by Letters Patent of the United States is:

Plastic pipe molding apparatus comprising a hollow shell having an opening, a mandrel within said shell, said mandrel comprising a plug at one end thereof positioned in said opening, a diaphragm in said shell extending around said mandrel between said mandrel and shell at said opening, means for sealing fluid in said diaphragm against passage outwardly between said plug and diaphragm including a resilient collar adjacent to said plug, said collar being integral with said diaphragm, a sealing portion of said collar extending longitudinally inwardly along said plug whereby motion of said diaphragm and collar longitudinally and radially of said plug during fluid pressure changes does not disrupt the contact between said sealing portion and said plug, a metallic cup secured to said plug overlying said diaphragm and collar lying closely adjacent to the inner surface of said shell in said opening and being expandible against said shell by said diaphragm, and a fluid pressure conduit in said plug leading to said diaphragm.

References Cited in the file of this patent

UNITED STATES PATENTS

| | | |
|---|---|---|
| 2,405,245 | Ushakoff | Aug. 6, 1946 |
| 2,696,184 | Demarest | Dec. 7, 1954 |